(12) United States Patent
Claus et al.

(10) Patent No.: US 6,707,878 B2
(45) Date of Patent: Mar. 16, 2004

(54) GENERALIZED FILTERED BACK-PROJECTION RECONSTRUCTION IN DIGITAL TOMOSYNTHESIS

(75) Inventors: Bernhard Erich Hermann Claus, Niskayuna, NY (US); Jeffrey Wayne Eberhard, Albany, NY (US)

(73) Assignee: General Electric Company, Schenectady, NY (US)

( * ) Notice: Subject to any disclaimer, the term of this patent is extended or adjusted under 35 U.S.C. 154(b) by 86 days.

(21) Appl. No.: 10/063,356

(22) Filed: Apr. 15, 2002

(65) Prior Publication Data

US 2003/0194049 A1 Oct. 16, 2003

(51) Int. Cl.$^7$ ................................ A61B 6/03
(52) U.S. Cl. ...................... 378/22; 378/4; 378/210
(58) Field of Search ...................... 378/4, 21, 22, 378/99

(56) References Cited

U.S. PATENT DOCUMENTS

| | | |
|---|---|---|
| 3,971,950 A | 7/1976 | Evans et al. |
| 4,407,163 A | 10/1983 | Hundt et al. |
| 4,509,368 A | 4/1985 | Whitiing et al. |
| 4,543,959 A | 10/1985 | Sepponen |
| 4,936,291 A | 6/1990 | Forssmann et al. |
| 5,361,767 A | 11/1994 | Yukov |
| 5,474,072 A | 12/1995 | Shmulewitz |
| 5,479,927 A | 1/1996 | Shmulewitz |
| 5,603,326 A | 2/1997 | Richter |
| 5,630,426 A | 5/1997 | Eggers et al. |
| 5,640,956 A | 6/1997 | Getzinger et al. |
| 5,660,185 A | 8/1997 | Shmulewitz et al. |
| 5,664,573 A | 9/1997 | Shmulewitz |
| 5,735,264 A | 4/1998 | Siczek et al. |
| 5,776,062 A | 7/1998 | Nields |
| 5,803,082 A | 9/1998 | Stapleton et al. |
| 5,810,742 A | 9/1998 | Pearlman |
| 5,820,552 A | 10/1998 | Crosby et al. |
| 5,828,774 A | 10/1998 | Wang |
| 5,840,022 A | 11/1998 | Richter |
| 5,851,180 A | 12/1998 | Crosby et al. |
| 5,855,554 A | 1/1999 | Schneider et al. |
| 5,872,828 A | 2/1999 | Niklason et al. |
| 5,938,613 A | 8/1999 | Shmulewitz |
| 5,983,123 A | 11/1999 | Shmulewitz |
| 5,984,870 A | 11/1999 | Giger et al. |
| 5,999,639 A | 12/1999 | Rogers et al. |
| 6,180,943 B1 | 1/2001 | Lange |
| 6,324,242 B1 | 11/2001 | Pan |
| 2001/0016030 A1 | 8/2001 | Nicolas et al. |
| 2003/0072478 A1 | 4/2003 | Claus et al. |

FOREIGN PATENT DOCUMENTS

| | | |
|---|---|---|
| EP | 1113382 A1 | 7/2001 |
| WO | WO 00/19902 | 4/2000 |

OTHER PUBLICATIONS

A. Thomas Stavros et al.: "Solid Breast Nodules: Use of Sonography to Distinguish between Benign and Malignant Lesions," Radiology, Jul. 1995, pp. 123–134, vol. 196, No. 1, Englewood, CO.

Thomas M. Kolb et al.: "Occult Cancer in Women with Dense Breasts: Detection with Screening US–Diagnostic Yield and Tumor Characteristics," Radiology, Apr. 1998, pp. 191–199, vol. 207, No. 1.

(List continued on next page.)

Primary Examiner—David V. Bruce
(74) Attorney, Agent, or Firm—Foley & Lardner

(57) ABSTRACT

There is provided a method of constructing a three dimensional (3D) image of an object from a plurality of two dimensional (2D) views of the object, comprising the steps of filtering the plurality of 2D views of the object, and order statistics-based backprojecting the filtered 2D views into the 3D image of the object.

40 Claims, 3 Drawing Sheets

OTHER PUBLICATIONS

Daniel B. Kopans et al.: "Development and Clinical Evaluation of Tomosynthesis for Digital Mammography; Technical and Cost Proposal," Clinical Translational Research Award, Department of Defense Breast Cancer Research Program, Nov. 19, 1997, pp. 1–54.

Nico Karssemeijer: "Computer–Aided Detection and Interpretation in Mammography," pp. 243–252.

Nico Karssemeijer et al.: "Detection of Stellate Distortions in Mammograms," IEEE Transactions on Medical Imaging, Oct. 1996, pp. 611–619, vol. 15, No. 5, IEEE.

Ioanna Christoyianni et al.: "Fast Detection of Masses in Computer–Aided Mammography," IEEE Signal Processing Magazine, Jan. 2000, pp. 54–64.

Celia Byrne et al.: "Mammographic Features and Breast Cancer Risk: Effects with Time, Age, and Menopause Status," Journal of the National Cancer Institute, Nov. 1, 1995, pp. 1622–1629, vol. 87, No. 21.

Milan Sonka et al.: "Computer–Aided Diagnosis in Mammography," Handbook of Medical Imaging—vol. 2. Medical Image Processing and Analysis, pp. 915–958, Spie Press, Bellingham, Washington.

Matthew A. Kupinski et al.: "Feature Selection and Classifiers for the Computerized Detection of Mass Lesions in Digital Mammography," IEEE Int. Conf. On Neural Nets, 1997, pp. 2460–2463, IEEE.

Shuk–Mei Lai et al.: "On Techniques for Detecting Circumscribed Masses in Mammograms," IEEE Transactions on Medical Imaging, Dec. 1989, pp. 377–386, vol. 8, No. 4, IEEE.

Marios A. Gavrielides et al.: "Segmentation of Suspicious Clustered Microcalcifications in Mammograms," Med. Phys., Jan. 2000, pp. 13–22, vol. 27, No. 1, Am. Assoc. Phys. Med.

Wei Zhang et al.: "Optimally Weighted Wavelet Transform Based on Supervised Training for Detection of Microcalcifications in Digital Mammograms," Med. Phys. Jun. 1998, pp. 949–956, vol. 25, No. 6, Am. Assoc. Phys. Med.

Berkman Sahiner et al.: "Computerized Characterization of Masses on Mammograms: The Rubber Band Straightening Transform and Texture Analysis," Med. Phys. Apr. 1998, pp. 516–526, vol. 25, No. 4, Am. Assoc. Phys. Med.

Zhimin Huo et al.: "Computerized Analysis of Mammographic Parenchymal Patterns for Breast Cancer Risk Assessment: Feature Selection," Med. Phys., Jan. 2000, pp. 4–12, vol. 27, No. 1, Am. Assoc. Phys. Med.

Datong Wei et al.: "Classification of Mass and Normal Breast Tissue on Digital Mammograms: Multiresolution Texture Analysis," Med. Phys. Sep. 1995, pp. 1501–1513, vol. 22, No. 9, Am. Assoc. Phys. Med.

John J. Heine et al.: "Multiresolution Statistical Analysis of High–Resolution Digital Mammograms," IEEE Transactions on Medical Imaging, Oct. 1997, pp. 503–515, vol. 16, No. 5, IEEE.

Wouter J. H. Veldkamp et al.: Normalization of Local Contrast in Mammograms, IEEE Transaction on Medical Imaging, Jul. 2000, pp. 731–738, vol. 19, No. 7, IEEE.

Wei Qian et al.: "Tree Structured Wavelet Transform Segmentation of Microcalcifications in Digital Mammography," Med. Phys., Aug. 1995, pp. 1247–1254, vol. 22, No. 8, Am. Assoc. Phys. Med.

Highnam et al.: "Mammographic Image Analysis," 1999, pp. 39–53, 191–223, 288, Kluwer Academic Publishers.

Duda et al.: "Pattern Classification," 2001, pp. 161–199.

Laura M. Yarusso et al.: "Application of Computer–Aided Diagnosis to Full–Field Digital Mammography," IWDM 2000, $5^{th}$ International Workshop on Digital Mammography, pp. 421–246, Medical Physics Publishing, Madison, Wisconsin.

Lihua Li et al.: "Hybrid Classification Method for False–Positive Reduction in CAD for Mass Detection," IWDM 2000, $5^{th}$ International Workshop on Digital Mammography, pp. 272–279, Medical Physics Publishing, Madison, Wisconsin.

Robert P. Velthuizen: "Computer Description of Mammographic Masses," IWDM 2000, $5^{th}$ International Workshop on Digital Mammography, pp. 395–401, Medical Physics Publishing, Madison, Wisconsin.

Armando Bazzani et al.: "Automatic Detection of Clustered Microcalcifications Using a Combined Method and an SVM Classifier," IWDM 2000, $5^{th}$ International Workshop on Digital Mammography, pp. 161–167, Medical Physics Publishing, Madison, Wisconsin.

Yoshihiro Hagihara et al.: "Accurate Detecton of Microcalcifications on Mammograms by Improvement of Morphological Processing," IWDM 2000, $5^{th}$ International Workshop on Digital Mammography, pp. 193–197, Medical Physics Publishing, Madison, Wisconsin.

M. Lanyi: "Diagnosis and Differential Diagnosis of Microcalcifications," Ductal Carcinomas of Varying Histologic Types, pp. 44, 60, 61, 86, 95, 98–101, 110, 118–120, 192, 1987, Springer–Verlag.

Daniel B. Kopans: "The Positive Predictive Value of Mammography," AJR, Mar. 1992, pp. 521–526, vol. 158, American Roentgen Ray Society.

Claus B E H et al: "A new method for 3D Reconstruction in Digital Tomosynthesis" Medical Imaging 2002, Proceedings of the Spie, vol. 4684, no. Part 1–3, Feb. 24–28, 2002, pp. 814–824.

GENERALIZED FILTERED BACK-PROJECTION RECONSTRUCTION IN DIGITAL TOMOSYNTHESIS

STATEMENT REGARDING FEDERALLY SPONSORED RESEARCH & DEVELOPMENT

The government may have rights in this invention pursuant to Subcontract 22287 issued from the Office of Naval Research/Henry M. Jackson Foundation.

BACKGROUND OF THE INVENTION

The present invention relates generally to digital imaging, and more particularly to reconstructing a three dimensional (3D) image using a tomosynthesis device.

It is well know in the medical community that breast cancer is a leading cause of death in women (and to a lesser extent also affects men). When early detection of abnormalities is combined with proper medical attention, however, the risk of death and/or severe medical ramifications can be drastically reduced. Many devices and techniques (e.g., mammography) are currently under development to detect breast abnormalities earlier, and with greater accuracy than conventional devices. A brief summary of some conventional devices, techniques, and their limitations follows.

Presently, the vast majority of mammography devices utilize conventional x-ray techniques. A patient's breast is positioned in an x-ray machine, which passes x-rays through the breast and generates a corresponding x-ray image on a film. The film is then analyzed by a trained clinician, who examines the film for abnormalities, such as a mass, a cyst, a microcalcification, a fibrous finding, an architectural distortion, and/or other abnormal findings related with benign or malignant abnormalities. In standard digital mammography, the x-ray image (or projection radiograph) is acquired by means of a digital detector, and the resulting digital image can be processed to enhance the visibility of structures within the image, thus providing a potentially more useful image to the clinician. These standard mammography techniques, however, suffer from many problems.

The 2D nature of standard mammography techniques (including standard digital and film based) can lead to superposition (e.g., overlay) problems. Superposition can occur when multiple structures are overlaid onto the same position in the projection image. The overlaid normal (i.e., non-malignant) structures may end up combining in appearance to appear as an abnormality, resulting in a "false positive" identification of an abnormality. Presently, the false positive rate is relatively high: on the order of between 70% and 90% of biopsies are normal. Conversely, real abnormalities may be superimposed over dense tissue regions which "hide" the abnormality within the dense tissue, resulting in a "false negative" miss of an abnormality. Thus, in standard 2D imaging (e.g., projection radiography) structures within the breast may become superimposed with each other, thereby normal structures within the breast can "interfere" with a clear interpretation of structures of interest (e.g., potentially malignant) which are located at a different height (relative to the projection direction) within the imaged object.

Another problem with many mammography techniques is related to contrast issues. A small structure within the breast appears with a relatively low contrast in the projection image, when compared to its true 3D contrast. For example, in a projection image of a breast with a thickness of 6 cm, a structure with a 2 cm thickness appears with only a third of its true contrast; a structure with 1 cm thickness appears with only a sixth of its true contrast, etc. Thus, the contrast in the image does not correctly represent the true contrast of the structure.

To improve on the limitations of 2D techniques, some techniques utilize a plurality of projection radiographs of a patient's breast to create a 3D image of the breast tissue. The 3D image is then examined by a trained clinician for indications of breast abnormalities. In these 3D techniques, the breast to be imaged is radiated from different projection angles. The radiation passing through the breast is used to generate a plurality of projection radiographs or "2D views" of the breast. A three dimensional (3D) image of the breast is then generated from the views using conventional or newly developed algorithms. Generally, the reconstructed 3D image is organized as a set of 2D images, or "slices", which are substantially parallel to the detector plane. As used herein, an "image slice" is a single image representative of the structures within an imaged object (e.g., breast tissue) at a fixed height above the detector. Other arrangements of the data representing the 3D image of the object are also possible, as would be readily apparent to one of ordinary skill in the art after reading this disclosure. One technique of generating a 3D image from a plurality of radiographs is known as simple backprojection. Conventional 3D image reconstruction techniques (such as those involving simple backprojection), however, also suffer from disadvantages.

In particular, high contrast structures in the imaged object can lead to severe artifacts that cause a significant reduction in the quality and the diagnostic value of reconstructed images. These artifacts are due to the fact that generally, image information due to structures in the imaged object not only contribute to the reconstruction at the corresponding true location of the structure within the reconstructed 3D image, but at other locations as well. The corresponding artifacts are known as out-of-plane artifacts, or streak artifacts. Conventional 3D reconstruction techniques, however, do not adequately remove or reduce artifacts.

In digital tomosynthesis, for example, one backprojection technique known as "simple backprojection" or the "shift and add algorithm" is often used to reconstruct images (e.g., 3D images) due to its relatively straightforward implementation and minimal computational power requirements. The shift and add algorithm, however, introduces reconstruction artifacts. In fact, high contrast out-of-plane structures tend to appear as several relatively low-contrast copies in a reconstructed horizontal slice through the object. Also, the previously described loss in contrast for small structures is not recovered by the simple backprojection reconstruction technique. Thus, the conventional shift and add algorithm suffers from considerable problems in this field of use.

Another reconstruction method used in tomosynthesis is known as the algebraic reconstruction technique (ART). ART tends to generate higher quality reconstructions than the shift and add algorithm, but is typically much more computational heavy than other techniques (e.g., the shift and add algorithm). This computational cost and the associated delay until the final 3D image of the breast is available to the clinician, can be prohibitive in practical clinical use.

Another reconstruction technique used in computed tomography (CT) imaging (i.e., filtered back-projection) utilizes projections over the full angular range (i.e., full 360° image acquisition about the object to be imaged) and a fine angular spacing between projections. Within this framework, filtered backprojection is a reconstruction method that yield high quality reconstructions with few artifacts. Unfortunately, full 360° image acquisition is not practical for many applications including breast imaging, where design considerations limit the ability to rotate fully about the breast.

Thus, a need exists for a method and apparatus for reconstructing a three dimensional (3D) image of an object (or other, but different reconstructed 2D images, for example cross-sectional images) from a plurality of two dimensional (2D) views.

BRIEF SUMMARY OF THE INVENTION

The present invention is directed at reducing or eliminating one or more of the problems set forth above, and other problems found within the prior art.

According to one aspect of the present invention, a method of constructing a three dimensional (3D) image of an object from a plurality of two dimensional (2D) views of the object is provided comprising the steps of filtering the plurality of 2D views of the object, and order statistics-based backprojecting the filtered 2D views into the 3D image of the object.

According to another aspect of the present invention, a program product is provided for causing a tomosynthesis device to perform the steps of acquiring a plurality of 2D views of an object to be imaged, filtering the acquired 2D views, and order statistics-based backprojecting the filtered 2D views into a 3D image of the object.

According to another aspect of the present invention, a method of compensating a 2D view for the thickness of an object to be analyzed, the view including pixels corresponding to rays passing through the object and pixels corresponding to rays not passing through the object is provided comprising the steps of determining a boundary curve, the boundary curve being the curve separating the pixels corresponding to rays passing through the object from the pixels corresponding to rays not passing through the object, calculating a distance from each pixel corresponding to rays passing through the object to the boundary curve, calculating an average pixel image value versus the distance from the boundary curve, and offsetting the image values at pixels corresponding to rays passing through the object such that the average pixel image value versus the distance from the boundary curve is about constant.

According to another aspect of the present invention an imaging device for constructing a three dimensional (3D) image of an object from a plurality of two dimensional (2D) views of the object is provided comprising a radiation source for emitting radiation through the object to be imaged, the radiation source being positionable at an angle of projection wherein each of the plurality of 2D views corresponds to a given position of the radiation source, a detector positioned to detect radiation passing through the object to be imaged, the detector generating a signal representing a view of the object, and a processor electrically coupled to the detector for analyzing the signal. The processor is programmed to perform the steps of filtering the plurality of 2D views, and order statistics-based backprojecting the filtered 2D views into the 3D image of the object.

According to another aspect of the present invention, a method of reconstruction of three dimensional (3D) structures from a plurality of projection radiographs of tissue taken at different angles, the method is provided comprising the steps of digitally acquiring a plurality of projection radiographs taken at different angles, segmenting each of the digitally acquired projection radiographs into pixels corresponding to rays passing through the tissue and pixels corresponding to rays not passing through the tissue, compensating the image values at segmented pixels for a thickness of the tissue, filtering the compensated pixels to enhance structures depicted in the projection radiographs, and order statistics-based backprojecting the filtered images into a reconstructed 3D representation of the tissue.

According to another aspect of the present invention, a method of constructing a three dimensional (3D) image of an object from a plurality of two dimensional (2D) views of the object is provided comprising the steps of 2D filtering the plurality of 2D views of the object, and simple backprojecting the filtered 2D views into the 3D image of the object.

DETAILED DESCRIPTION OF THE INVENTION

Reference will now be made in detail to presently preferred embodiments of the present invention. Wherever possible, the same reference numbers will be used throughout the drawings to refer to the same or like parts.

The present invention will be described in reference to apparatuses and methodology for breast imaging and breast cancer detection. It should be appreciated, however, that the teachings of the present invention may also be used in other areas, such as chest and lung imaging, orthopedic imaging, and other medical and non-medical applications (e.g., non-destructive evaluation).

Figure 1:
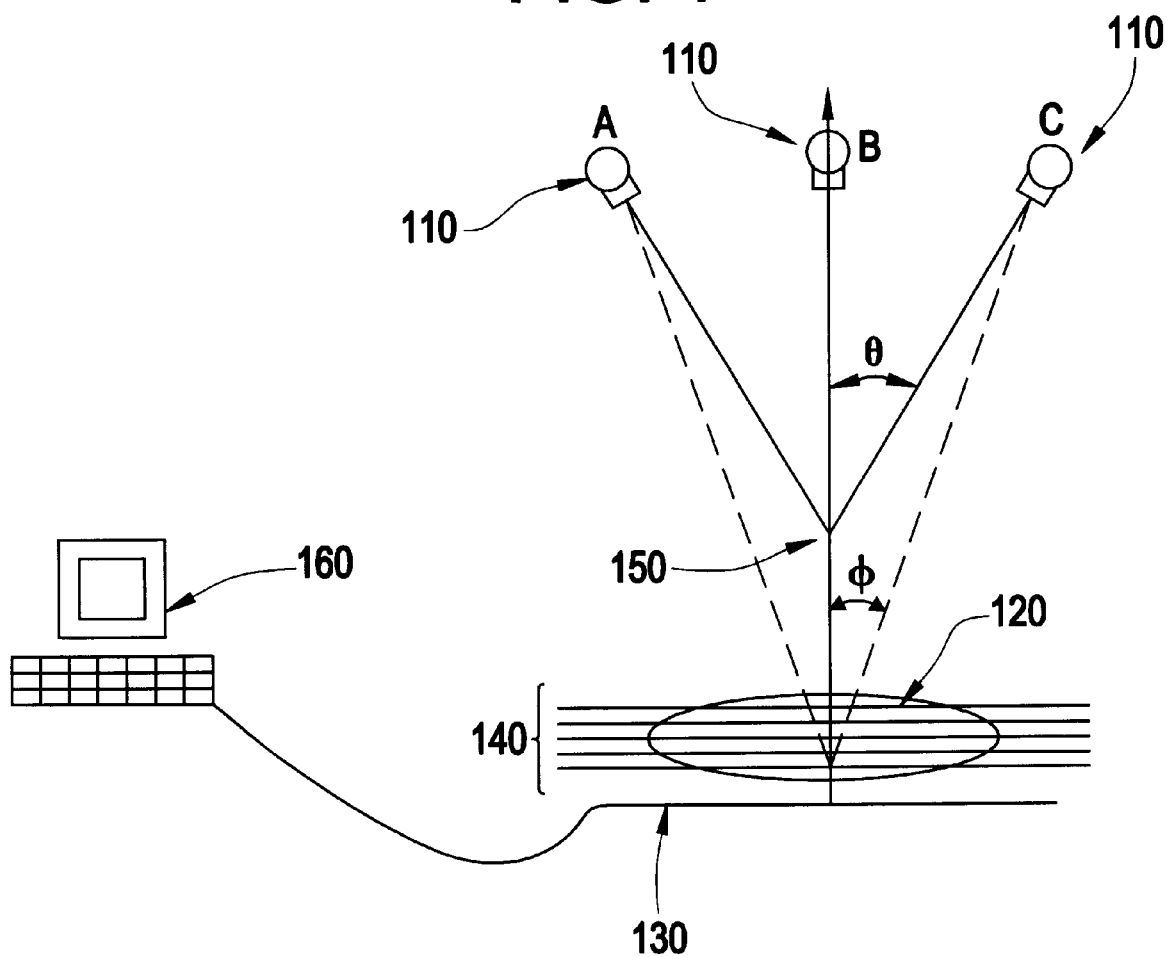
FIG. 1 is a diagram of a tomosynthesis device according to an embodiment of the present invention.

A tomosynthesis device according to one embodiment of the present invention is shown in FIG. 1. A radiation source 110 for emitting x-ray radiation is angularly displaceable through a plurality of emission positions A, B, C corresponding to a plurality of views of the tissue 120. While only three emission positions are shown in FIG. 1, one of ordinary skill in the art will recognize that three emission positions or fewer or more emission positions may be utilized, while remaining within the scope of the invention. The radiation source 110 is angularly displaceable so as to enable acquisition of radiographs of the breast from different projection angles. This can be achieved, for example, by angularly displacing the radiation source 100 about a pivot point 150, preferably about 15 cm above the breast tissue. The radiation source 110 is angularly displaceable through a projection angle ((, which is preferably less than ±180°. Preferably, (( is in the range of less than about ±45°, and most preferably less than about ±30°. More preferably, at least 11 emission positions are used, and spaced at about constant angular spacings. In the system configuration of FIG. 1, the projection angle (( is generally significantly smaller than the "gantry angle" ((. The projection angle (( is essentially given by the angle of a ray of the beam passing through the "center" of the object, with reference to some "zero-degree" angle. Unlike in computed tomography (CT)

scanning, the radiation source 110 is preferably not angularly displaceable all the way around the breast tissue 120.

A detector 130 is positioned substantially opposite of the radiation source 110, with respect to the imaged object 120 to detect radiation emitted through the tissue 120, the detector generating a signal representing a view of the tissue 120, the detector 130 is positioned less than about 25 cm (most preferably about 22.4 cm) below the pivot point 150. The signal is transmitted to a computer 160, including a processor for analyzing the view (and reconstructing image slices 140). Preferably, the computer is part of a tomosynthesis device including the radiation source 110 and the detector 130. Alternatively, the signal may be stored on a storage media or transmitted to a central computer system, and later analyzed by computer 160. Such a configuration may occur, for example, with a mobile tomosynthesis system that takes data of a patient's breast at a remote site, which is later analyzed at a laboratory.

Other tomosynthesis system configurations are also plausible, as would be readily apparent to one of ordinary skill in the art after reading this disclosure. One such system may employ a radiation source movable along a track rather than on a rotating gantry, preferably with a radiation source to detector distance in the range of about 100 cm to about 180 cm. The aforementioned configurations have been provided for purposes of illustration only, and are not limiting on the scope of this application.

Figure 2:
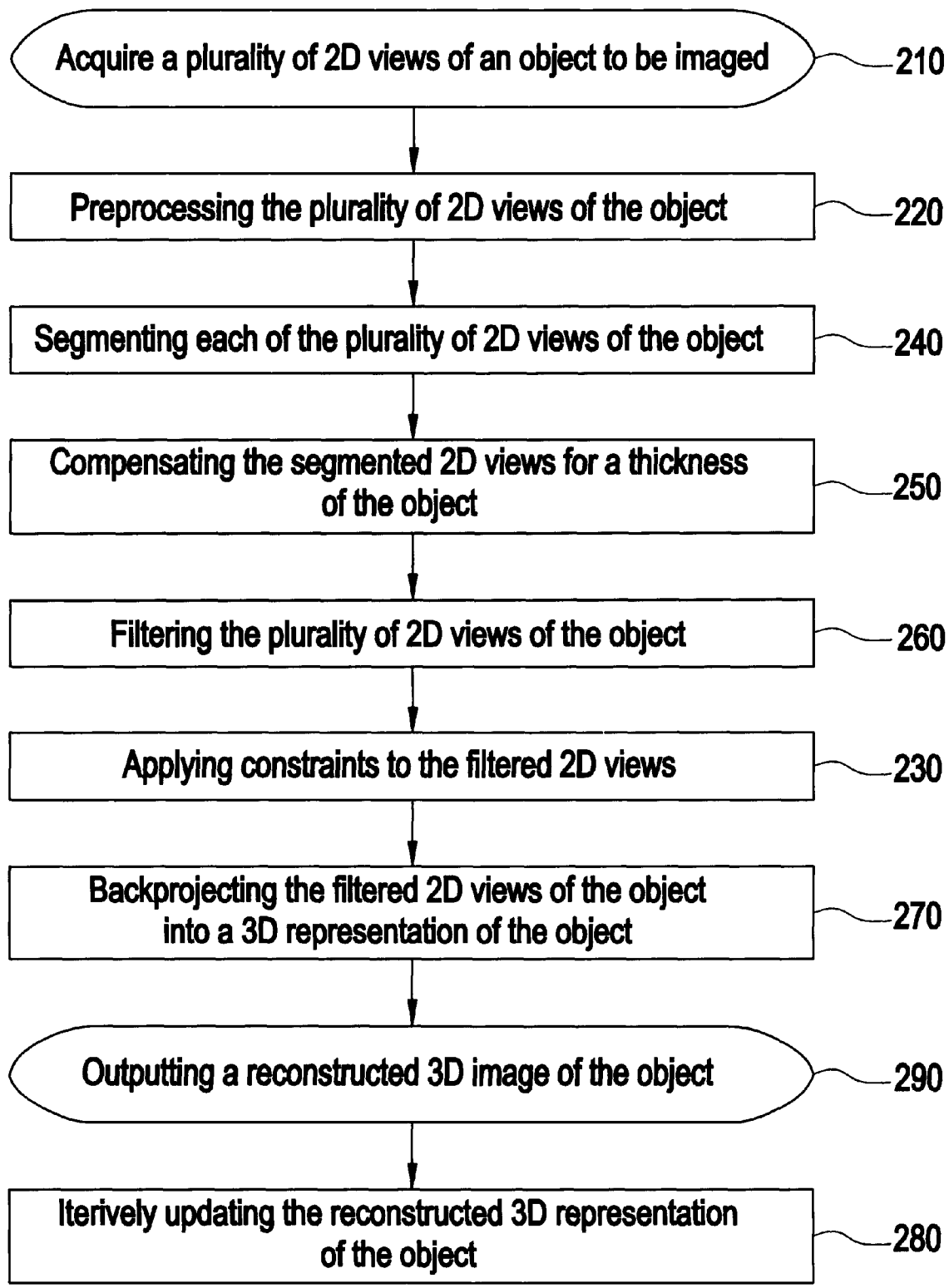
FIG. 2 is a flow chart of a method of constructing a 3D image of an object from a plurality of 2D views of the object according to an embodiment of the present invention.
Figure 3:
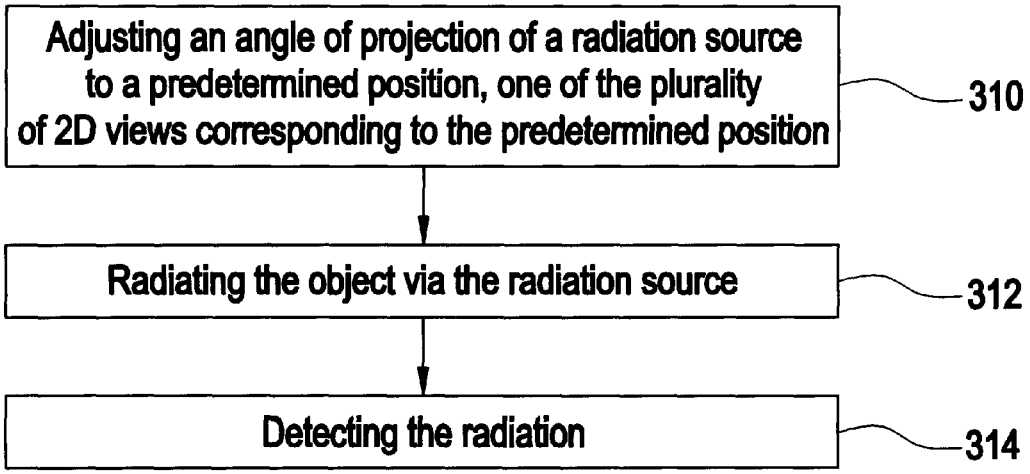
FIG. 3 is a flow chart of a method of acquiring a plurality of 2D views of the object according to an embodiment of the present invention.

A flow chart depicting a method of constructing a 3D image of an object (e.g., breast tissue) from a plurality of 2D views of the object according to one embodiment of the present invention is shown in FIG. 2. In step 210, a plurality of 2D views of the object is acquired. Step 210 can be performed, for example, using any one of a number of techniques (e.g., using a digital detector), provided the views can be made in (or converted to) digital form. As shown in FIG. 3, step 210 preferably includes the steps of adjusting an angle of projection of a radiation source to a substantially predetermined position (corresponding to one of the plurality of 2D views in step 310), radiating the object via the radiation source in step 312, and detecting the radiation in step 314.

Preferably, the acquired plurality of 2D views of the object are preprocessed in step 220, to perform image corrections on the acquired plurality of views. Preprocessing may include one or more of correction for geometry effects such as distance to x-ray tube & incident angle of x-rays at detector, correction for other system effects such as gain and offset correction, correction for pathlength through the tissue, taking the negative log of the image, and other preprocessing aspects as would be readily apparent to one of ordinary skill in the art after reading this disclosure. Preprocessing may also include corrections for effects due to varying detector positions from view to view. Preferably, after preprocessing step 220, the image value at each pixel in a view represents the average linear attenuation value of the imaged object along the ray corresponding to that pixel, for an assumed underlying constant thickness.

In step 240, each of the plurality of 2D views of the object is segmented (e.g., assigning to each pixel of each 2D view whether it contains only "air" information, or tissue information) using techniques such as image value histogram segmentation, edge detection, contour following, etc. Step 240 may also include the use of prior shape information (e.g., using smoothness constraints of the skin line), etc. Preferably, step 240 segments each view into pixels corresponding to rays passing through the object and pixels corresponding to rays not passing through the object. The term "ray" refers to a given part of the x-ray beam represented by a line between the focal spot of the x-ray source and the considered pixel. This segmentation step 240 can also provide a boundary curve (i.e., a curve separating the pixels corresponding to rays passing through the object from the pixels corresponding to rays not passing through the object), which can be used in the thickness compensation step 250. Other segmenting techniques may also be used, as would be readily apparent to one of ordinary skill in the art after reading this disclosure.

By performing segmentation step 240, pixels not containing useful information (i.e., pixels corresponding to rays not passing through the object) can be given a constant image value, preferably about equal to an average image value for pixels corresponding to rays passing through the object. The inventors have found that this enhances the appearance of structures (including abnormalities) within the reconstructed 3D image of the object, and reduces artifacts. Thus, the overall performance of the reconstruction can be greatly improved. As will be described in detail below, segmentation step 240 is particularly effective when used in combination with the thickness compensation step 250.

Figure 4:
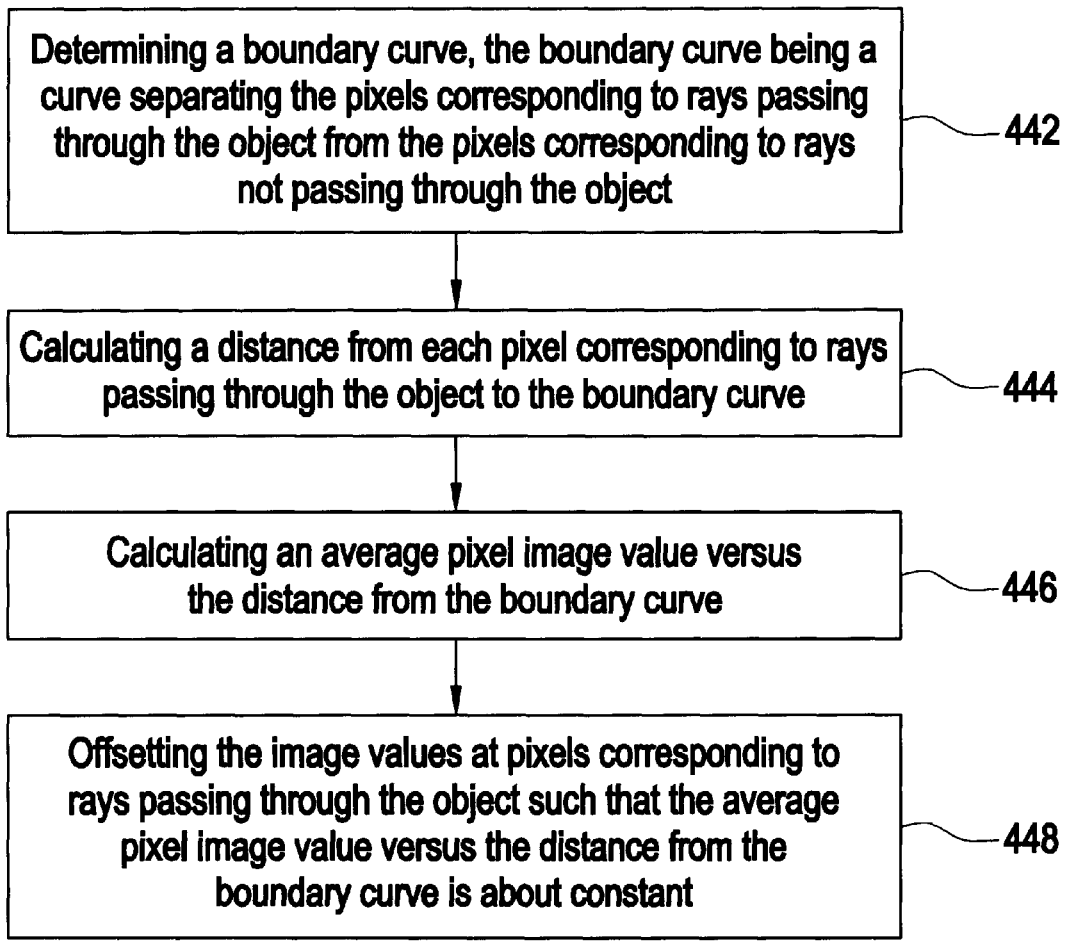
FIG. 4 is a flow chart of a method of compensating for the thickness of an object to be analyzed from a view of the object according to an embodiment of the present invention.

In step 250, the segmented 2D views of the object are compensated for a thickness of the object. Conventional thickness compensation techniques can be used for step 250. In a preferred embodiment, however, step 250 includes steps 442, 444, 446, and 448 as shown in FIG. 4. Specifically, step 250 preferably determines a boundary curve in step 442, the boundary curve being a curve separating the pixels corresponding to rays passing through the object from the pixels corresponding to rays not passing through the object. A distance is then calculated in step 444 from each pixel corresponding to rays passing through the object to the boundary curve. Further, an average image value versus the distance from the boundary curve is calculated in step 446. Finally, step 448 offsets (e.g., by adding an offset value) the image values at pixels corresponding to rays passing through the object such that the average image gray value versus the distance from the boundary curve is about constant. The inventors have found that this particular thickness compensation technique provides a significant reduction of reconstruction artifacts due to the reduced thickness of the imaged object near the boundary. Unlike other thickness compensation techniques, it also preserves coarse scale in the image corresponding to variations in tissue characteristics that are not due to the reduced thickness.

The inventors have also found that thickness compensation step 250 allows for a "fair comparison" of different image values in the backprojected 2D views, in the sense that backprojecting step 270 preferably uses an order statistics operator, and therefore "compares" different image values from different projection images. A "bias" in one (or more) values which is due to a reduced thickness at the corresponding location can have a negative impact on the resulting reconstructed 3D image. This effect can be minimized by first applying thickness correction step 250. Thus, thickness correction step 250 provides substantial advantages over conventional techniques.

The plurality of 2D views are then filtered in step 260. Filtering step 260 can preferably be performed as a one-dimensional (1D) or 2D filtering application. In 1D filtering, one can map the appropriate filters from CT geometry (i.e., fully 360° acquisition, with the detector rotating opposite of the tube such that the incoming x-rays are substantially perpendicular to the detector surface for all views) to a tomosynthesis geometry (i.e., less than 360° acquisition, and the angle of the incoming x-rays on the detector varies from view to view). Ideally, the mapped filter would be shift-variant, but the effect on the image quality of the reconstructed volume is generally negligible. One can thus use "mapped" versions of the "classical" filters, as well as other 1D filters which are ideally optimized with respect to some reconstruction image quality criterion. Depending on the specific acquisition geometry, it may be advantageous to use a different filter for each view. The inventors have discovered, however, that 1D filters are not very effective in enhancing structures which are essentially parallel to the direction of the filtering. Thus, 2D filtering is preferred.

The inventors have discovered that for structures with a characteristic size which is smaller than the compressed thickness of the breast, the contrast of the structure (within the imaged volume) is in reality higher than its apparent contrast in a conventional projection image. This "loss in contrast" is increasingly significant with decreasing size of the imaged structure. By estimating that the expected thickness of a structure is roughly the same as its extent in x/y (i.e., its extent in a plane essentially parallel to the detector), one can therefore design a 2D filter such that it enhances the contrast of structures of a characteristic size C by a factor of T/C, where C is the size of the structure, and T is the thickness of the imaged breast.

Thus preferably, step 260 emphasizes structures (e.g., emphasizes the contrast of structures) within the 2D view having a specific predetermined size. Further, step 260 preferably also does not emphasize structures having a characteristic size less than a minimum characteristic size by more than some predetermined amount. This maximum amount of emphasis may be advantageous to avoid enhancing noise in the image. In a preferred embodiment, step 260 emphasizes different structures having a size in one of several different size ranges by a different amount depending on which particular size range the structure falls in. Thus, for purposes of illustration, assuming the following conditions: (1) a tissue thickness of 6 cm; (2) a structure having a characteristic size of 3 cm; (3) a structure having a characteristic size of 1 cm; and (4) a structure having a character size of 1 mm. Furthermore, assume that a multi-scale filtering process is used where: (1) structures with a characteristic size of under 1 cm are emphasized by a factor 6; (2) structures with a characteristic size of 1 cm to 6 cm are emphasized by T/C, where T is the thickness of the breast, and C is the characteristic size of the structure; and (3) structures with a characteristic size of greater than 6 cm are not emphasized (i.e., emphasized by a factor 1). Thus, the structure with a characteristic size of 3 cm would be emphasized by 6.0/3.0, or 2.0. Similarly, the structure with a characteristic size of 1 cm would be emphasized by 6.0/1.0, or 6.0. Finally, the character size of 1 mm would be emphasized by 6.0. Other plausible ranges/emphasis factors are also plausible, as would be readily apparent to one of ordinary skill in the art after reading this disclosure.

The inventors have found that the above described emphasis of different characteristic size ranges by different emphasis amounts greatly improves the contrast and readability of the reconstructed image. The inventors have found that where the contrast of fine scale structures (e.g., the range of up to 6 cm in the previous example) is strongly enhanced, and coarse scale structures (e.g., the range greater than 6 cm in the previous example) are less enhanced tends to result in high quality, high contrast reconstructions, with fewer artifacts, and a high re-projection consistency. Removing small structures (i.e., an emphasis of 0) is generally not an option, particularly in mammography, where small calcifications, even of a size smaller than one single pixel can be important. Thus, the filtered projection radiographs are enhanced in that they exhibit a more realistic contrast scale of the imaged structures (relative to the "true" 3D contrast) than conventional projection radiographs.

It may be advantageous to use slightly different filters for filtering different 2D views, where the filter is adapted to the specific acquisition geometry for that view. Also, the filters may be adapted to the overall geometry of the acquisition of the plurality of 2D views. This may be useful, for example, if the radiation source is displaced along a substantially linear trajectory. This leads to the fact that, for example, elongated structures that lie in a plane parallel to the detector, with an orientation parallel to the scan direction of the radiation source, undergo a different enhancement in the reconstruction than elongated structures that lie in the same plane, but with an orientation that is perpendicular to the scan direction of the radiation source. Thus, the filter may be adapted to counteract this characteristic behavior of the reconstruction process. In other applications, it may also be of interest, for example, to emphasize only structures of a characteristic size by some maximum amount, and not emphasize structures of any other characteristic size.

As would be readily apparent to one of ordinary skill in the art after reading this disclosure, the particular filter design can be done in a number of various techniques. The specific filter used can be designed in the frequency domain (e.g., each frequency can be associated with a typical characteristic size of corresponding structures), or in the spatial domain (e.g., convolution with a Gaussian kernel can be interpreted to preserve structures which are larger than a characteristic size, and therefore one can use Gaussian kernels to design filters which extract structures of a given size from an image—other kernels could also be used). In both frequency domain and spatial domain design, the filter is preferably designed as a linear filter (or a combination of several linear filters), the output of which yields an enhanced image. However, one can alternatively also use morphological filters, multiscale techniques (e.g., wavelet decomposition or Laplacian pyramid, etc.) and other techniques to yield enhanced projection radiographs. The particular technique chosen will be determined by the particular application requirements and the typical structural characteristics of the imaged objects.

The inventors have further discovered that it can be advantageous to apply constraints to the filtered 2D views in step 230, such that only "physically admissible" image values are retained for further analysis. For example, negative values (which do not correspond to physical reality) may be set to zero, or the maximum attenuation of the material of the imaged object may be known, which would allow one to derive a maximum meaningful value, and the image could thus be truncated to that maximum meaningful value. As only physically admissible image values are retained, constraint application improves the noise and artifact characteristics of the reconstruction method.

The filtered plurality of 2D views of the object are then backprojected into a 3D representation of the object in step 270. Preferably, step 270 uses an order statistics-based backprojecting technique as described below.

Order statistics-based backprojection has some similarities to simple backprojection reconstruction, though it is significantly different in many aspects. Specifically, in order statistics based backprojecting, the averaging operator which is used to combine individual backprojected image values at any given location in the reconstructed volume is replaced by an order statistics operator. Thus, instead of simply averaging the backprojected pixel image values at each considered point in the reconstructed volume, an order statistics based operator is applied on a voxel-by-voxel basis.

Depending on the specific framework, different order statistics operators may be used (e.g., minimum, maximum, median, etc.), but in breast imaging an operator which averages all values with the exception of some maximum and some minimum values is preferred. More generally, an operator which computes a weighted average of the sorted values can be used, where the weights depend on the ranking of the backprojected image values. In particular, the weights corresponding to some maximum and some minimum values may be set to zero. By using the aforementioned operator for breast imaging, streak artifacts (which are generally caused either by high contrast structures—maxima, or by the "overshoot" caused by the filtering of some high contrast structure—minima) are minimized, while some of the noise reduction properties of the linear averaging operator are retained.

Backprojecting step 270 is further improved by backprojecting data already segmented in step 240. For example, one can use the segmentation result to set a reconstructed value to zero (or some other appropriate value) if at least a single backprojected image value indicates an "outside" location (i.e., the corresponding pixel in that view was determined not to correspond to a ray passing through the imaged object). In addition, if some voxel in the reconstruction volume is not contained in all projection radiographs (e.g., because for some projection angle the corresponding point was not projected onto the active area of the detector), then only the projection radiographs that contain this voxel are taken into account in the reconstruction. In an alternate approach, one can artificially increase the image size by adding regions to the boundaries of the image and setting the image values in these regions equal to the "background value." Both of these approaches help to minimize artifacts which are due, for example, to the boundary effects of the detector.

There may be an additional step of applying constraints to the reconstructed dataset/3D image after the reconstruction. Constraint application may include setting negative values to zero, truncating high values to the maximum value for the type of object imaged, etc. This optional step, which can be useful by itself, may be particularly useful in combination with iterative update step 280 described in detail below.

If desired, step 280 may be provided to iteratively update the reconstructed 3D representation of the object. Step 280 may comprise re-projecting the reconstructed 3D image of the object, comparing the reconstructed 3D image to the acquired views, and updating the reconstructed 3D image of the object. Step 280 may be performed prior to outputting a reconstructed 3D image of the object in step 290, or may be performed at intervals followed by an updated outputted 3D image. Other implementation variations are also plausible as would be readily apparent to one of ordinary skill in the art after reading this disclosure.

The inventors have found in experiments, that the image quality improved substantially with the filtered backprojection technique over both the simple backprojection and ART techniques. In general, increased image contrast and reduced artifacts provides a substantially better image for analysis by a clinician or CAD system.

It should be noted that although the flow chart(s) provided herein show a specific order of method steps, it is understood that the order of these steps may differ from what is depicted, and that all or any subset of the method steps can be employed in practice. Also two or more steps may be performed concurrently or with partial concurrence. Such variation will depend on the software and hardware systems chosen, which is generally considered a matter of designer choice. It is understood that all such variations are within the scope of the invention.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of constructing a three dimensional (3D) image of an object from a plurality of two dimensional (2D) views of the object, comprising the steps of:

filtering said plurality of 2D views of the object; and order statistics-based backprojecting said filtered 2D views into the 3D image of the object.

2. The method of claim 1, further comprising a step of:

acquiring said plurality of 2D views of the object, wherein the step of filtering said plurality of 2D views of the object filters said acquired plurality of 2D views of the object.

3. The method of claim 2, wherein the step of acquiring said plurality of 2D views comprises:

adjusting an angle of projection of a radiation source to a predetermined position, one of said plurality of 2D views corresponding to said predetermined position;

radiating said object via said radiation source; and detecting said radiation from said object.

4. The method of claim 3, wherein the total angular range of the angle of projection is less than 360°.

5. The method of claim 4, wherein the total angular range of the angle of projection is less than about 90°.

6. The method of claim 1, wherein the object comprises breast tissue.

7. The method of claim 1, further comprising a step of:

preprocessing said plurality of 2D views of the object prior to filtering said plurality of 2D views of the object.

8. The method of claim 1, further comprising a step of:

segmenting each of said plurality of 2D views of the object, wherein each 2D view includes a plurality of pixels, and wherein segmenting segments each view into pixels corresponding to rays passing through said object and pixels corresponding to rays not passing through said object.

9. The method of claim 8, further comprising a step of:

compensating said segmented 2D views for a thickness of said object.

10. The method of claim 9, wherein the step of compensating said segmented 2D views for the thickness of said object comprises the steps of:

determining a boundary curve, the boundary curve being a curve separating said pixels corresponding to rays passing through said object from said pixels corresponding to rays not passing through said object;

calculating a distance from each pixel corresponding to rays passing through said object to said boundary curve;

calculating an average pixel image value versus the distance from said boundary curve; and offsetting said image values at pixels corresponding to rays passing through said object such that the average pixel image value versus the distance from said boundary curve is about constant.

11. The method of claim 1, wherein said object has a thickness T, and wherein the step of filtering said plurality of 2D views of the object comprises a step of:

emphasizing structures within said 2D views having a characteristic size C by a factor of T/C, C being less than T.

12. The method of claim 11, wherein the step of filtering said plurality of 2D views of the object does not emphasize structures within said 2D views having a characteristic size less than a minimum character size by more than a maximum amount.

13. The method of claim 1, wherein the step of backprojecting said filtered 2D views into the 3D image of the object applies an order statistics based operator to said backprojected filtered 2D views on a voxel-by-voxel basis.

14. The method of claim 8, wherein the step of backprojecting said filtered 2D views into the 3D image of the object applies an order statistics based operator on a voxel-by-voxel basis only to voxels where each backprojected pixel corresponds to a ray passing through said object.

15. The method of claim 8, wherein the step of backprojecting said filtered 2D views into the 3D image of the object sets values at voxels in the 3D image where at least a single packprojected pixel corresponds to a ray not passing through the object to a predetermined value.

16. The method of claim 1, wherein the step of filtering said plurality of 2D views of the object comprises a step of:

adjusting a filter filtering said 2D view to the relative position of a detector and radiation source and the object for the acquisition of the view.

17. The method of claim 1, further comprising a step of: applying constraints to the filtered 2D views.

18. A program product for causing a tomosynthesis device to perform the steps of:

acquiring a plurality of 2D views of an object to be imaged;

filtering said acquired 2D views; and order statistics-based backprojecting said filtered 2D views into a 3D image of the object.

19. The program product of claim 18, wherein the step of acquiring said plurality of 2D views comprises the steps of:

adjusting an angle of projection of a radiation source to a predetermined position, one of said plurality of 2D views corresponding to said predetermined position;

radiating said object via said radiation source; and detecting said radiation.

20. The program product of claim 19, wherein the total angular range of the angle of projection is less than 360°.

21. The program product of claim 20, wherein the total angular range of the angle of projection is less than about 90°.

22. The program product of claim 18, further causing a tomosynthesis device to perform the step of:

segmenting each of said plurality of acquired 2D views of the object, wherein each acquired 2D view includes a plurality of pixels, and wherein segmenting segments each acquired 2D view into pixels corresponding to rays passing through said object and pixels corresponding to rays not passing through said object.

23. The program product of claim 22, further causing a tomosynthesis device to perform the step of:

compensating said segmented 2D views for a thickness of said object.

24. The program product of claim 23, wherein the step of compensating said segmented 2D views for the thickness of said object comprises the steps of:

determining a boundary curve, the boundary curve being a curve separating said pixels corresponding to rays passing through said object from said pixels corresponding to rays not passing through said object;

calculating a distance from each pixel corresponding to rays passing through said object to said boundary curve;

calculating an average pixel image value versus the distance from said boundary curve; and offsetting said image values at pixels corresponding to rays passing through said object such that the average pixel image value versus the distance from said boundary curve is about constant.

25. The program product of claim 18, wherein the step of backprojecting said filtered 2D views into the 3D image of the object applies an order statistics based operator to said backprojected filtered 2D views on a voxel-by-voxel basis.

26. A method of compensating a 2D view for the thickness of an object to be analyzed, said view including pixels corresponding to rays passing through said object and pixels corresponding to rays not passing through said object, comprising the steps of:

determining a boundary curve, the boundary curve being the curve separating said pixels corresponding to rays passing through said object from said pixels corresponding to rays not passing through said object;

calculating a distance from each pixel corresponding to rays passing through said object to said boundary curve;

calculating an average pixel image value versus the distance from said boundary curve; and offsetting said image values at pixels corresponding to rays passing through said object such that the average pixel image value versus the distance from said boundary curve is about constant.

27. The method of claim 26, wherein the object comprises breast tissue.

28. An imaging device for constructing a three dimensional (3D) image of an object from a plurality of two dimensional (2D) views of the object, comprising:

a radiation source for emitting radiation through the object to be imaged, said radiation source being positionable at an angle of projection wherein each of said plurality of 2D views corresponds to a given position of said radiation source;

a detector positioned to detect radiation passing through the object to be imaged, said detector generating a signal representing a view of said object; and a processor electrically coupled to said detector for analyzing said signal, wherein said processor is programmed to perform the steps of:

filtering said plurality of 2D views; and order statistics-based backprojecting said filtered 2D views into the 3D image of the object.

29. The imaging device of claim 28, wherein at least one of the plurality of 2D views does not include imaging of the object at a location about an edge portion of said detector, and wherein the step of backprojecting said filtered 2D views into the 3D image of the object at said location ignores views that do not include imaging at said location.

30. The imaging device of claim 28, wherein the total angular range of the angle of projection is less than 360°.

31. The imaging device of claim 28, wherein the processor is further programmed to perform a step of:
preprocessing said plurality of 2D views of the object prior to filtering said plurality of 2D views of the object.

32. The imaging device of claim 28, wherein the processor is further programmed to perform a step of:
segmenting each of said plurality of acquired 2D views of the object, wherein each acquired 2D view includes a plurality of pixels, and wherein segmenting segments each acquired 2D view into pixels corresponding to rays passing through said object and pixels corresponding to rays not passing through said object.

33. The imaging device of claim 32, wherein the processor is further programmed to perform a step of:
compensating said segmented 2D views for a thickness of said object.

34. The imaging device of claim 33, wherein the step of compensating said segmented 2D views for the thickness of said object comprises the steps of:
determining a boundary curve, the boundary curve being a curve separating said pixels corresponding to rays passing through said object from said pixels corresponding to rays not passing through said object;
calculating a distance from each pixel corresponding to rays passing through said object to said boundary curve;
calculating an average pixel image value versus the distance from said boundary curve; and
offsetting said image values at pixels corresponding to rays passing through said object such that the average pixel image value versus the distance from said boundary curve is about constant.

35. The imaging device of claim 28, wherein the step of backprojecting said filtered 2D views into the 3D image of the object applies an order statistics based operator to said backprojected filtered 2D views on a voxel-by-voxel basis.

36. A method of reconstruction of three dimensional (3D) structures from a plurality of projection radiographs of tissue taken at different angles, the method comprising the steps of:
digitally acquiring a plurality of projection radiographs taken at different angles;
segmenting each of said digitally acquired projection radiographs into pixels corresponding to rays passing through said tissue and pixels corresponding to rays not passing through said tissue;
compensating said image values at segmented pixels for a thickness of said tissue;
filtering said compensated pixels to enhance structures depicted in said projection radiographs; and
order statistics-based backprojecting said filtered images into a reconstructed 3D representation of said tissue.

37. The method of claim 36, further comprising a step of:
iteratively updating said reconstructed 3D representation of said tissue.

38. A method of constructing a three dimensional (3D) image of an object from a plurality of two dimensional (2D) views of the object, comprising the steps of:
2D filtering said plurality of 2D views of the object; and
simple backprojecting said filtered 2D views into the 3D image of the object.

39. The method of claim 38, wherein the object comprises breast tissue.

40. The method of claim 38, further comprising at least one of:
digitally acquiring said plurality of 2D views, said plurality of 2D views being taken at different angles;
segmenting each of said 2D views into pixels corresponding to rays passing through said object and pixels corresponding to rays not passing through said object; and
compensating said 2D views for a thickness of said object.

* * * * *